Aug. 21, 1956  C. DE LA SOURCE  2,760,136
SPEED VARIATOR FOR ELECTRIC MOTORS
Filed March 8, 1955
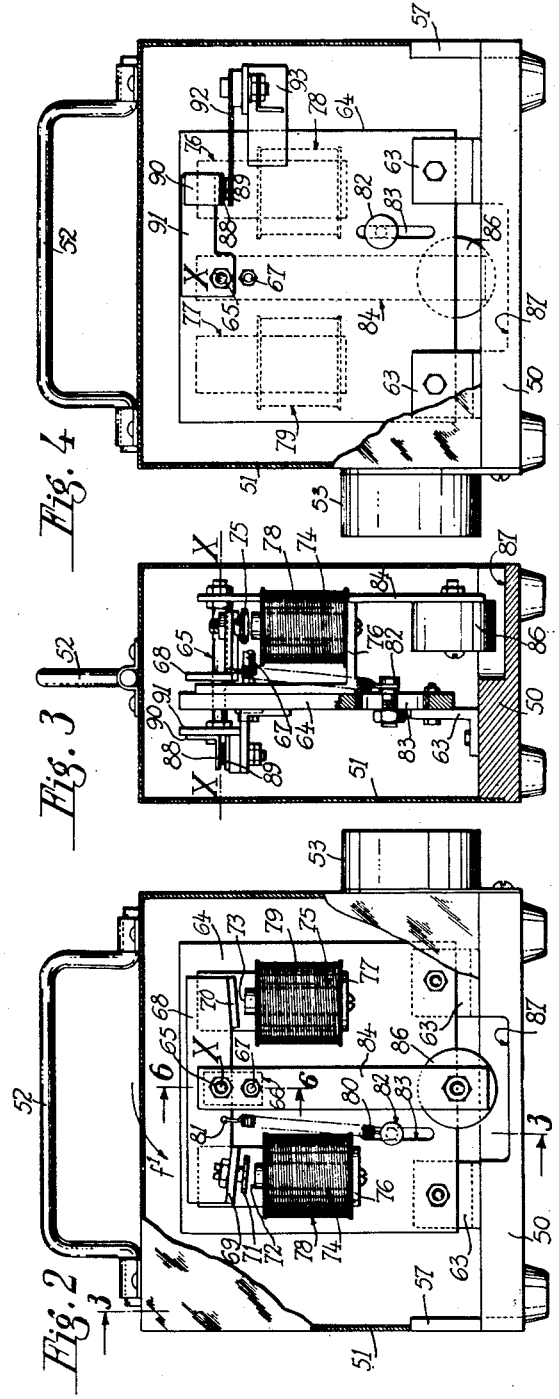
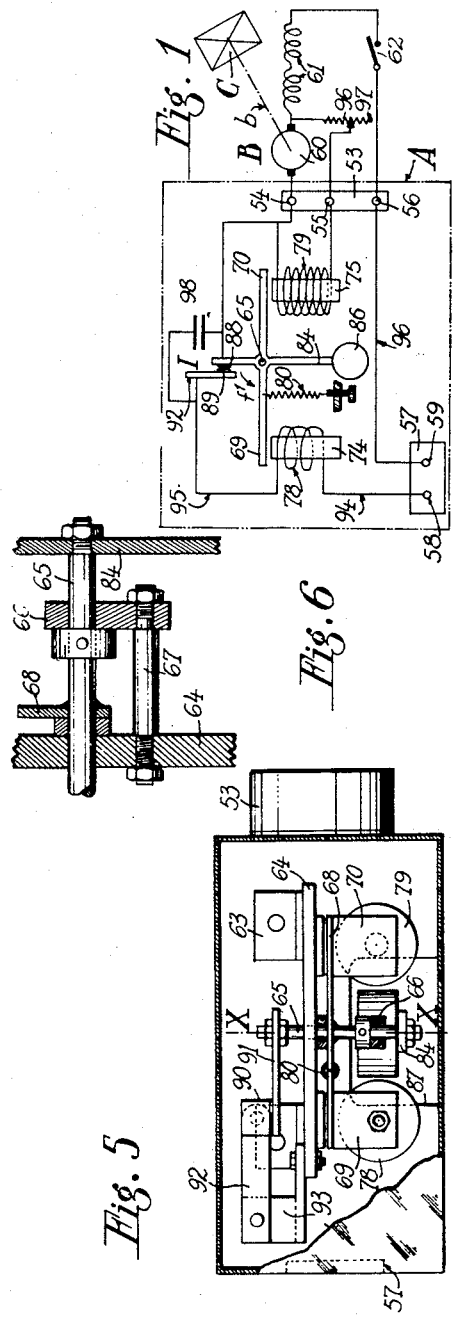
Charles de la Source
INVENTOR
By Richardson, David and Nodon
his ATT'YS.

United States Patent Office 2,760,136
Patented Aug. 21, 1956

2,760,136

SPEED VARIATOR FOR ELECTRIC MOTORS

Charles de la Source, Paris, France, assignor to Ste: Peugeot & Cie, Paris, France, a French body corporate Application March 8, 1955, Serial No. 493,011

Claims priority, application France March 18, 1954

4 Claims. (Cl. 318—331)

The present invention relates to speed variators for universal electric motors of the type described in copending patent application No. 365,073 and which comprises a vibrator including an oscillating unit combined with an electromagnetic actuating device having two coils, one of the latter being connected in series and the other in parallel with the supply circuit of the motor, and, secondly, with a switch adapted to be interposed in this supply circuit for opening or closing this circuit in accordance with the position of said vibrating element.

The present invention has for object to provide a speed variator of this type which is improved so as to permit interruption of current of high intensity exceeding three amperes and which is therefore of use for regulating the speed of a powerful universal motor capable of consuming on full load a current exceeding 5 amperes.

This is accomplished owing to the fact that the oscillating unit, which includes two blades co-operating with two cores on which are disposed the two coils of the electromagnetic device, is so adapted and arranged that these blades are displaced in the direction of the axis of these cores.

By means of this arrangement it is possible considerably to increase the contact pressure, which ensures the closure of the switch when the power consumed is important, since the force of attraction is proportional to this power.

According to another feature, said oscillating unit forms a pendulum provided with a weight which increases its time constant.

This weight is associated with the movement of the blades and therefore regularizes the pulses by reducing their number and, moreover, increases the pressure of contact owing to its inertia at the instant of closing the switch.

According to a further feature, the movable element of the switch is rigidly supported by the pendulum. Thus, there is no intermediate element between this pendulum and the switch.

This invention has for further object, installations and apparatus comprising in combination an electric motor and a speed variator improved in the manner described above.

Further features and advantages of the invention will be apparent from the ensuing description.

In the accompanying drawings, given merely by way of example:

Fig. 1 is an electric diagram of an installation or apparatus comprising a universal electric motor equipped with a speed variator embodying the invention;

Fig. 2 is a front view of said variator, a part having been cut away;

Fig. 3 is a cross-sectional view taken along line 3—3 of Fig. 2;

Fig. 4 is a view similar to that in Fig. 2 of the opposite side of the speed variator;

Fig. 5 is a plan view thereof with parts cut away; and

Fig. 6 is a partial vertical sectional view on an enlarged scale taken along line 6—6 of Fig. 2.

According to the illustrated embodiment, the speed variator, generally indicated at A (Fig. 1), is combined with a universal series motor, generally indicated at B, whose shaft $b$ is adapted to drive a device, generally indicated at C, such as for example a blade of a coffee grinder or the tool of a like apparatus.

The speed variator A comprises (Figs. 2 to 5) a housing comprising a stand 50 to which is attached a case 51 provided at its upper end with a pivotable handle 52. One of the transverse walls of this housing carries a plug socket 53 having three terminals 54, 55, and 56 and the other wall carries a socket 57 having two terminals 58 and 59. The latter are provided for connecting the speed variator A to a source of electric current, whereas the terminals 54, 55, and 56 are provided for connecting up the motor B. The terminals 54 and 55 connect through the armature winding 60 of the motor and terminals 55 and 56 connect through the field windings 61.

A switch 62 is provided between the terminal 56 and the field windings and a rheostat 96 with a dead stud 97 is provided between the other terminal 55 and the armature winding.

The connections between the terminals of the two plugs 53 and 57 inside the housing will be described hereinunder.

Fixed to the stand 50 inside the housing, for example by means of two brackets 63, is a vertical insulating side plate 64. Mounted in this plate for rotational movement about a horizontal axis XX, is a shaft 65. This shaft is journalled directly in the plate 64 and furthermore in a bearing 66 (see Fig. 6) attached to the plate 64 by a rod 67 parallel with said shaft 65.

Secured to the shaft 65 by welding or otherwise, is a transverse bar 68 which is cranked at both ends so as to form two blades 69 and 70. The blade 69 carries an adjustable stud 71.

These blades 69 and 70 are slightly oblique relative to the horizontal plane when the bar 68 is in a horizontal position, so that during the oscillations of this bar about the axis XX in either direction the stud 71 or the blade 70 are capable of bearing respectively against the entire surface of the upper ends 72 and 73 of one or other of two conjugate cores 74 and 75.

The cores 74 and 75 are fixed to the plate 64 by brackets 76 and 77. The core 74 carries a heavy-wire coil 78 and the core 75 a fine-wire coil 79.

A spring 80, fixed at 81 to the bar 68 and to the plate 64 by a rod 82 adjustable in position in a slot 83 formed in the plate 64, urges the bar 68 to pivot about the axis XX in the direction to apply the stud 71 on the core 74 with variable force, depending on the position of the attachment 82 in the slot 83.

The oscillating unit is completed by a pendulum comprising a strip 84 rigidly secured to the end of the shaft 65 and carrying at its end a weight 86. This pendulum is free to oscillate in a recess 87 formed in the stand 50. The position of this weight may be made adjustable along the strip 84 if desired.

The pendulum unit thus obtained has a relatively high time constant (of the order of 0.2 second). This unit is adapted to cause oscillation of the movable stud 88 of a switch I comprising this movable stud 88 and a fixed stud 89.

The stud 88 is fixed to the horizontal branch of a bracket 90 connected to a lever 91, the latter being fixed to an extension of the shaft 65 at the rear of the plate 64.

The stud 89 is carried by the end of a resilient blade 92 secured by a member 93 to the plate 64.

The electric circuits in the speed variator are as follows: the terminal 58 is connected by a conductor 94 (Fig. 1) to one of the ends of the heavy-wire coil 78, the other end of the latter being connected by another conductor 95 to the stud 89 of the switch I; the stud 88 of this switch is connected to the terminal 54 of the plug socket 53. The other terminal 59 supplying the current is directly connected by a conductor 96 to the output terminal 56.

The fine-wire coil 79 is directly connected to the output terminals 54 and 55.

As can be seen, the unit just described forms two distinct magnetic circuits, one being through the core 74, the blade 69 and the bracket 76, and the other through the core 75, the blade 70 and the bracket 77. Furthermore, the coil 78 is connected in series with the switch I, the armature winding 60 and the field windings 61 of the motor, whereas the fine-wire coil 79 is connected in parallel with the armature winding 60.

Provided inside the speed variator A, is a capacitor 98, which appears only in the diagram shown in Fig. 1. This capacitor is connected to the terminals of the switch I so as to shunt this switch.

The variator operates in the following manner:

If the circuit of the rheostat 96 is connected to the dead stud 97, the coil 79 of the variator is cut out and the motor operates as a normal motor without any regulation, since the current in the coil 78 attracts the blade 69 and, in combination with the action of the spring 80, oscillates the pendulum unit in the direction of arrow $f^1$ (Figs. 1 and 2) about the axis XX and thereby closes the switch I.

When it is desired to utilize the speed variator A, the slider of the rheostat 96 is shifted in such manner that a certain current is carried by the coil 79. The two coils 78 and 79 create two opposing torques which act in a differential manner on the bar 68 and, under the action of these opposing torques augmented by the force exerted by the spring 80, the vibrator operates at such frequency that the motor B rotates at the desired speed, allowance being made for the resistant torque of the device C being driven.

When the flux in the magnetic circuit comprising the core 75 is such that the torque due to the attraction exerted by this core 75 on the blade 70 exceeds the sum of the torque due to the attraction exerted by the core 74 on the blade 69 owing to current in the winding 78 and the torque due to the spring 80, the pendulum unit oscillates in the opposite direction to the arrow $f^1$ and thus opens the switch I. The circuit of the motor B is then opened. The differential action of the two coils 78 and 79 ceases immediately and, under the action of the return spring 80, the pendulum unit once more oscillates in the direction of the arrow $f^1$ and closes the switch I and so on.

The pressure on the contacts of the switch during its closure is proportional to the power consumed.

It is obvious that the frequency of the interruptions of the current is a function of the difference exerted on the pendulum unit by the two magnetic circuits; the smaller this difference (while remaining greater than the torque due to the return spring) the higher the frequency of interruptions (while remaining, however, compatible with the relatively high time constant of the pendulum due to the presence of the pendulum comprising the strip 84 and the weight 86).

If the motor B slows down and its load increases, the current in the coil 78 increases. The differential action exerted by the two electromagnets on the bar decreases and the frequency of the current interruptions increases. Thus, the energy supplied to the motor B increases the motor torque increase and the motor resumes the speed for which it was regulated (apart from slip).

If it is desired to modify the speed of the motor and therefore the operational frequency of the vibrator, it is possible to modify the rheostat 86, or the tension of the spring 80 by means of its adjustable attachment 82, or the air gap between the stud 71 and the core 74.

Experiments have shown that the speed of the motor may be varied between its normal no-load speed $n$ and a speed substantially $n/4$. The vibrator permits reducing the difference between the no-load speed and the full-load speed and thus obtaining a substantially constant speed between the no-load operation and full-load operation; when overloaded, the speed decreases in accordance with the normal curve of the motor. Thus, from the no-load operation to full-load operation there is obtained a curve of the power as a function of the speed which is very similar to that of a synchronous motor. On overload the normal curve of universal motors is obtained, which is more favourable than that of synchronous motors.

The above-described variator affords, furthermore, the following advantages:

(a) As has been mentioned above, owing to the fact that the blades 69 and 70 are not displaced in a direction perpendicular to the cores but parallel to the axes of the latter the pressure of contact of the switch I may be considerably increased when the power consumed exceeds a certain value, since the force of attraction exerted by the coil 78 is proportional to this power.

(b) The weight 86, moved by the blades, regularizes and reduces the number of pulses by the high time constant obtained and increases the pressure of contact by its inertia at the instant when the switch is closed.

(c) Owing to the increase in the contact pressure and in the gap between separated contacts (the movable stud is rigidly secured to the shaft 65 and no longer to the flexible blade, which has a limited travel), to the regulation to a low value of the speed of interruptions, and to the slow beats due to the high time constant of the oscillating system, the switching sparks are to a very large extent reduced. As will be understood, slow switching, in the case of alternating current, is necessarily effected over a period much longer than the very short periods of substantially maximum current intensity, whereas quick switching could possibly coincide with the maximum intensity periods.

Although a specific embodiment of the invention has been described hereinbefore, the invention is not limited thereto since many modifications and changes may be effected in this embodiment without departing from the spirit of the invention or the scope of the appended claims.

Having now described my invention what I claim as new and desire to secure by Letters Patent is:

1. In a speed variator which has a vibrator, is for a universal electric motor and of the type comprising an electromagnetic device including two coils one of which is adapted to be connected in series and the other in parallel with the supply circuit of the motor, two cores carrying respectively the two coils, an oscillable unit comprising a pendulum provided with a weight and two blades co-operating respectively with said cores and adapted to be displaced in the direction of the axis of said cores, and a switch mechanically connected to said oscillable unit and disposed in the circuit of said motor, and of said coil connected in series, for closing and opening the supply circuit according to the position of said oscillable unit.

2. In a speed variator which has a vibrator, is for a universal electric motor and of the type comprising an electromagnetic device including two coils one of which is adapted to be connected in series and the other in parallel with the supply circuit of the motor, a plate, two cores supported by the latter and respectively supporting the two coils, an oscillable unit supported by said plate, said oscillable unit comprising a pendulum provided with a weight and two blades co-operating respectively with said cores and adapted to be displaced in the direction of the axis of said cores, and a switch mechanically connected to said oscillable unit and disposed in the circuit of said motor and of said coil connected in series, for closing and opening the supply circuit according to the position of said oscillable unit, said switch comprising a stud carried by a rigid lever fixed to said pendulum and a stud fixed to the end of a resilient blade held at its other end in a support fixed to the plate.

3. In a speed variator which has a vibrator, is for a universal electric motor and of the type comprising an electromagnetic device including two coils one of which is adapted to be connected in series and the other in parallel with the supply circuit of the motor, a plate, two cores supported by the latter and respectively supporting the two coils, an oscillable unit supported by said plate, said oscillable unit comprising an oscillable bar, a pendulum connected to said bar and provided with a weight, two blades fixed to said bar, co-operating respectively with said cores and adapted to be displaced in the direction of the axis of said cores, and a switch mechanically connected to said oscillable unit and disposed in the circuit of said motor and of said series connected coil, for closing or opening the supply circuit according to the position of said oscillable unit, and a spring fixed to said bar and to said plate for urging the oscillable unit to oscillate in the same direction as the action exerted by said series connected coil.

4. In a speed variator which has a vibrator, is for a universal electric motor and of the type comprising an electromagnetic device including two coils one of which is adapted to be connected in series and the other in parallel with the supply circuit of the motor, a plate, two cores supported by the latter and respectively supporting the two coils, an oscillable unit supported by said plate, said oscillable unit comprising an oscillable bar, a pendulum connected to said bar and provided with a weight, two blades fixed to said bar, co-operating respectively with said cores and adapted to be displaced in the direction of the axis of said cores, and a switch mechanically connected to said oscillable unit and disposed in the circuit of said motor and of said series connected coil, for closing or opening the supply circuit according to the position of said oscillable unit, and a spring fixed to said bar and to said plate by an attachment adjustable in position on the latter for urging the oscillable unit to oscillate in the same direction as the action exerted by said series connected coil.

References Cited in the file of this patent

UNITED STATES PATENTS 2,376,522     Storm  ---------------- May 27, 1945